United States Patent
Anderson

(10) Patent No.: US 6,652,760 B2
(45) Date of Patent: Nov. 25, 2003

(54) INTERNAL FILTER FOR FISCHER-TROPSCH CATALYST/WAX SEPARATION

(75) Inventor: John H. Anderson, Tulsa, OK (US)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 09/804,427

(22) Filed: Mar. 12, 2001

(65) Prior Publication Data

US 2002/0128330 A1 Sep. 12, 2002

(51) Int. Cl.⁷ .......................... B01D 29/62; B01D 29/66; B01D 35/12
(52) U.S. Cl. .................... 210/767; 210/791; 210/323.2; 210/333.01; 210/340
(58) Field of Search ................................ 210/767, 791, 210/797, 798, 323.2, 333.01, 340

(56) References Cited

U.S. PATENT DOCUMENTS

| | | | |
|---|---|---|---|
| 4,605,678 A | 8/1986 | Brennan et al. | 518/700 |
| 5,174,907 A | * 12/1992 | Chown et al. | 210/791 |
| 5,422,375 A | 6/1995 | Ryter et al. | 518/700 |
| 5,439,588 A | * 8/1995 | Chown et al. | 210/350 |
| 5,599,849 A | 2/1997 | Jager et al. | 518/700 |
| 5,770,629 A | 6/1998 | Degeorge et al. | 518/700 |
| 5,811,469 A | 9/1998 | Leviness et al. | 518/700 |
| 5,817,702 A | 10/1998 | Behrmann et al. | 518/700 |
| 5,827,903 A | 10/1998 | White et al. | 518/710 |
| 5,844,006 A | 12/1998 | Jager et al. | 518/700 |
| 5,906,751 A | * 5/1999 | Parker | 210/741 |
| 6,068,760 A | 5/2000 | Benham et al. | 208/980 |
| 6,105,788 A | * 8/2000 | Williamson et al. | 210/489 |

FOREIGN PATENT DOCUMENTS

EP 0609079 A1 3/1994 .............. B01J/8/22

OTHER PUBLICATIONS

Class 210 Schedule—Liquid purification or Separation; p. 210–6; Definition pp. 210–43 through 210–45, 1994.*
International Schedule; p. containing subclass B01D 35/12, 1994.*
Copy of Patent Specification as Filed At U.S.A. Patent Office; Applicants: Sasol Chemical Industries (Proprietary) Limited; Title of Invention: Process for Producing Liquid And, Optionally, Gaseous Products From Gaseous Reactants; No.: 08/187,189; Date of Filing: Jan. 25, 1994.

* cited by examiner

Primary Examiner—Robert J. Popovics
(74) Attorney, Agent, or Firm—Frank C. Turner; Morris N. Reinisch; Howrey, Simon, Arnold & White, LLP

(57) ABSTRACT

The present invention encompasses a process for producing synthetic hydrocarbon products in a reactor. The focus of the present invention is on a novel filtering system for separating synthetic hydrocarbon products from catalyst within the reactor. The filtering system of the present invention could also be used for a variety of similar processes where it is desirable to separate a solid from a liquid within the solid/liquid mixture. Finally, the present invention discloses a novel filter and a method for making the filter.

6 Claims, 3 Drawing Sheets

INTERNAL FILTER FOR FISCHER-TROPSCH CATALYST/WAX SEPARATION

BACKGROUND OF THE INVENTION

Slurry hydrocarbon synthesis (HCS) processes are known. In a slurry HCS process a synthesis gas (syngas) comprising a mixture of $H_2$ and CO is bubbled up as a third phase through a solid/liquid slurry in a reactor. The products of the HCS reaction are generally gaseous and liquid hydrocarbons. The slurry comprises the liquid hydrocarbon products of the synthesis reaction and the dispersed, suspended solids comprise a hydrocarbon synthesis catalyst, most commonly a catalyst known in the Fischer-Tropsch process family of catalysts and entrained syngas.

Reactors which contain such a three phase slurry are sometimes referred to as "bubble columns", as is disclosed in U.S. Pat. No. 5,348,982. The catalyst particles are typically kept dispersed and suspended in the liquid by the lifting action of the syngas bubbling up through the slurry and by hydraulic means. Mechanical means such as impellers and propellers and the like are not used, as they will quickly erode and cause attrition of the catalyst particles. One or more vertical, gas disengaging downcomers may be used as hydraulic means to assist in maintaining more uniform catalyst dispersion, by providing a vertical catalyst circulation in the slurry, as is disclosed in U.S. Pat. No. 5,382,748. The slurry liquid comprises the liquid hydrocarbon products of the HCS reaction and needs to be separated from the catalyst particles and removed from the reactor for further processing and upgrading to the desired end products.

It is considered to be desirable to effectively and more efficiently convert coal and natural gas into synthesis gas, and synthesis gas into highly valued hydrocarbons, such as diesel motor fuel with high cetane number, petrochemical feedstocks, and hydrocarbon waxes. It is well known that synthesis gas will undergo conversion to form the reduction products of carbon monoxide, such as hydrocarbons, at temperatures in the range of from about 350° F. (176° C.) to about 850° F. (454° C.) and under pressures in the range of from about 1 to 1000 atmospheres (about 101.3 kPa to about 101,325 kPa), over a fairly wide variety of catalysts. The Fischer-Tropsch process, for example, which has been most extensively studied, produces a wide range of products including waxy materials, oxygenates and liquid hydrocarbons, a portion of which have been successfully used as low octane gasoline. The types of catalysts that have been studied for this and related processes include those based on metals or oxides of iron, cobalt, nickel, ruthenium, thorium, rhodium and osmium with and without promoters.

In a Fischer-Tropsch slurry reactor, the syngas is reacted on a powdered catalyst to form liquid hydrocarbons and waxes. The slurry is maintained at a constant level by continuously or intermittently removing wax from the reactor. The main problem with wax removal is that the catalyst in the wax should be separated from the slurry and returned to the reactor so as to maintain a constant inventory of catalyst in the reactor. It is preferable that reactors are run at steady state, meaning the rate of production or products remains relatively constant. Removing the catalyst from the reactor can upset the reactor steady state, in that any fluctuations in the catalyst concentration can affect the rate and type of products made in the reactor. Also, in order to keep the catalyst losses within the required replacement rate due to deactivation, the clarified wax removed from the system should not contain more than about 0.25% catalyst by weight. Accordingly, there is a need for a filtration process in which a clarified wax can be removed from the reactor while limiting the effect on the reactor steady state.

SUMMARY OF THE INVENTION

The present invention encompasses a process for producing synthetic hydrocarbon products. This invention involves feeding synthesis gas to a Fischer-Tropsch reactor and allowing the synthesis gas to react with catalyst to form liquid synthetic hydrocarbon products. The liquid synthetic hydrocarbon products are separated from the catalyst particles by passing the liquid synthetic hydrocarbon products through a plurality of closed end cylindrical filters located within the reactor, such that the liquid passes through the filters and the catalyst particles conglomerate on the outside of the filters. Each filter comprises a porous reactor side (outer) metal cylinder, a porous product side (inner) metal cylinder, and a filter medium located between the porous reactor side metal cylinder and the porous product side metal cylinder.

As the liquid synthetic hydrocarbon product is removed from the filters, a portion of it is pumped into a pulse surge vessel, such that the pressure of the pulse surge vessel is higher than the pressure of the Fischer-Tropsch reactor. At some point, it will become desirable to remove conglomerated catalyst from the reactor side of the filters, i.e. from the porous reactor side metal cylinder. At that time, the synthetic liquid hydrocarbon product through at least one of the filters should be stopped by closing a valve on the liquid synthetic hydrocarbon product outlet line.

To clear the filter, a quick opening valve on an outlet of the pulse surge vessel is opened, sending high pressure synthetic liquid hydrocarbon product from the pulse surge vessel to a backflushing liquid inlet of the filter. This allows for synthetic liquid hydrocarbon to flow from the pulse surge vessel into the filter, and then out of the filter into the Fischer-Tropsch reactor so as to dislodge the conglomerated catalyst particles from the outside of the filters.

Generally, the porosity of the filter medium is for about 0.5 to about 100 micron (1 micron=$1\times10^{-6}$ m) filtration, and the porosity of the product side and reactor metal cylinders is accomplished with about ⅛-inch (about 0.31 cm) to about 1-inch (about 2.54 cm) holes. The hole size is limited in that if the porosity were too large the metal cylinders would not be able maintain their rigid, cylindrical shape and thus lose its structural integrity. In this invention, the porosity of the product side metal cylinder is greater than that of the reactor side metal cylinder. The holes of the inside, product side metal cylinders are preferably tapered, such that the diameters of the holes are larger on the product side of the cylinders than at the surface of the cylinders facing the reactor side cylinders. The inside openings of the reactor side metal cylinder holes are preferably substantially the same size as the opening of the surface of the product side metal cylinders facing the reactor side cylinders. The reactor side metal cylinder holes may be tapered as well, with the holes having a larger diameter at the outer surface of the reactor side metal cylinder than at the inner surface of the same cylinder, the surface facing the product side cylinder.

In general, this invention discloses a filtering process than can be used for separating liquids from solids in almost any application, not just for Fischer-Tropsch product/catalyst separation. The filter of the present invention is designed with the Fischer-Tropsch process in mind, but is applicable for many similar processes.

Finally, the present invention discloses a novel filter for use as described above and in the illustrative embodiments. This invention also discloses a novel method for making the filter. The steps for making the filter comprise heat expanding a porous outer metal cylinder, cold shrinking a porous inner metal cylinder, inserting a cylindrical filter medium into the expanded porous outer metal cylinder, and placing the shrunken porous inner metal cylinder into the cylindrical filter medium. After the above steps are done, the combination of the three elements should be brought to an intermediate temperature so as to cool the heat expanded porous outer metal cylinder and heat the cold shrunken porous inner metal cylinder. This will allow for a tight seal between the elements of the filter.

DESCRIPTION OF ILLUSTRATIVE EMBODIMENTS

Figure 1A:
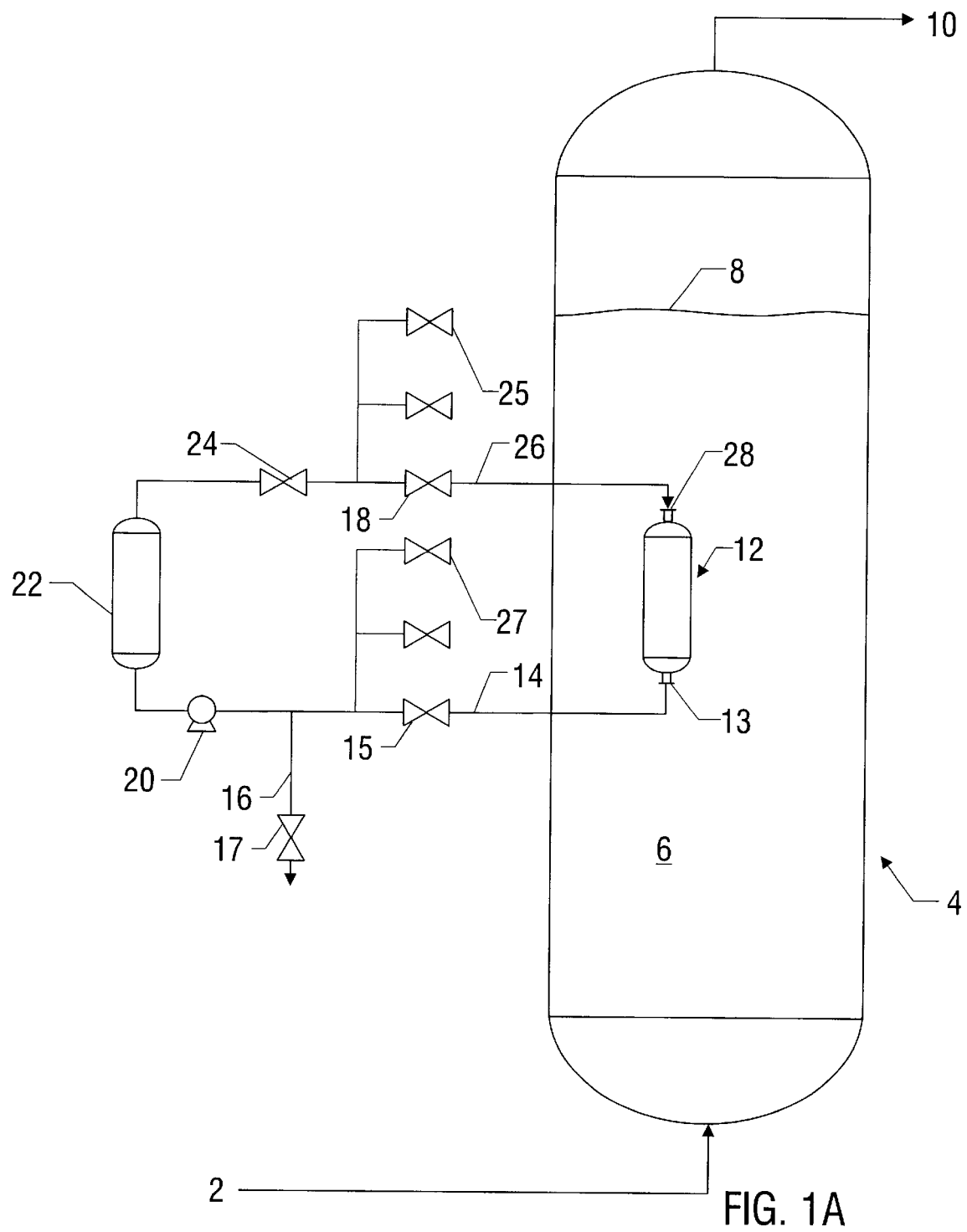
FIG. 1A illustrates the preferred embodiment of the present invention.

The preferred embodiment of the present invention encompasses a process for producing synthetic hydrocarbon products. Referring now to FIG. 1, synthesis gas is fed to a Fischer-Tropsch reactor 4 via line 2 and allowed to react to form gaseous and liquid synthetic hydrocarbon products 6. The gaseous synthetic hydrocarbon products are then removed from the reactor 4 through a vapor outlet 10. Next, the liquid synthetic hydrocarbon products 6 are separated from the catalyst particles (not shown) in the Fischer-Tropsch reactor 4. This is accomplished by passing the liquid synthetic hydrocarbon products 6 through a plurality of cylindrical filters 12 (one shown) located within the reactor 4 wherein the liquid passes through the filters and the catalyst particles conglomerate on the outside of the filters 12.

The next step of the process involves removing the liquid synthetic hydrocarbon product from the filters through the filter product outlet 13 and through line 14. Liquid synthetic hydrocarbon product is taken from the system through line 16 at a rate to maintain a level 8 of the slurry in the reactor 4. At least a portion of the liquid synthetic hydrocarbon product is pumped into a pulse surge vessel 22. A pumping means 20 is necessary as the pressure of the pulse surge vessel 22 should be higher than the pressure of the Fischer-Tropsch reactor 4.

When flow through a filter begins to become restricted, it will become necessary to remove the conglomerated catalyst from the outside of the filter. When this becomes necessary, the passage of synthetic liquid hydrocarbon product through the filter that needs to be cleared should be stopped by closing block valve 15.

To clear the filter, one should open block valve 18 in line 26, allowing for flow between surge vessel 22 and the filter 12. Then, a quick opening valve 24 on an outlet of the pulse surge vessel 22 should be opened, sending the synthetic liquid hydrocarbon product in the pulse surge vessel 22 through line 26 to the backflushing liquid inlet 28 of the filter 12. This allows the pressure pulse of the synthetic liquid hydrocarbon to flow from the pulse surge vessel 22 into the filter 12, and then out of the filter into the Fischer-Tropsch reactor 4 so as to dislodge the conglomerated catalyst particles from the outside of the filters 12. After optionally pulsing the quick opening valve 24, wherein one would open and close the quick opening valve more than once, one should close the quick opening valve 24 and restart the passage of synthetic liquid hydrocarbon product from the Fischer-Tropsch reactor 4 through the filter 12 by opening valve 15. Usually the time necessary to clear the filter is less than one minute.

An important aspect in the synthetic hydrocarbon production process is keeping the system at steady state. This essentially means that after a certain time after startup or after a disturbance, the synthesis gas coming into the reactor reacts with the catalyst at a constant rate. Thus, under the conditions of the reactor, what ever they may be, the rate of production of liquid hydrocarbons is relatively constant. Small fluctuations in, for example, temperature, pressure, flowrate or composition can knock the process out of steady state. That is why it is desirable to have multiple filter elements in the body of the reactor. Only one filter system is shown in FIG. 1 for simplicity purposes, but it is within the contemplation of the present invention, and is also preferred, that there be multiple filters connected to the same surge vessel 22, as well as being multiple surge vessels connected to many other filters within the same reactor.

If, for example, only one filter was used, the system would have to be completely shut down so that the filter may be cleared. Using many filters connected to the same pump 20 and surge vessel 22, one to as may filters connected to a single surge vessel can be cleared by manipulating block valves 25 and 27. Using a plurality of filters served by several pumps 20 and surge vessels 22, allows the operator of the system to clear one, or a few, filters, and leave a majority of the filters in normal operation allowing for continuous product flowrate. This will minimize the cleaning step has on the steady state of the reactor.

Furthermore, by using synthetic liquid hydrocarbon for the filter cleaning, the cleaning step does not introduce any new material into the reactor. As stated previously, a composition change can also throw the reactor out of steady state. By reintroducing the liquid hydrocarbons into the reactor, the effect on steady state is minimal, and the reactor performance is thus not hindered during the cleaning step of one or more of the filters.

Figure 1B:
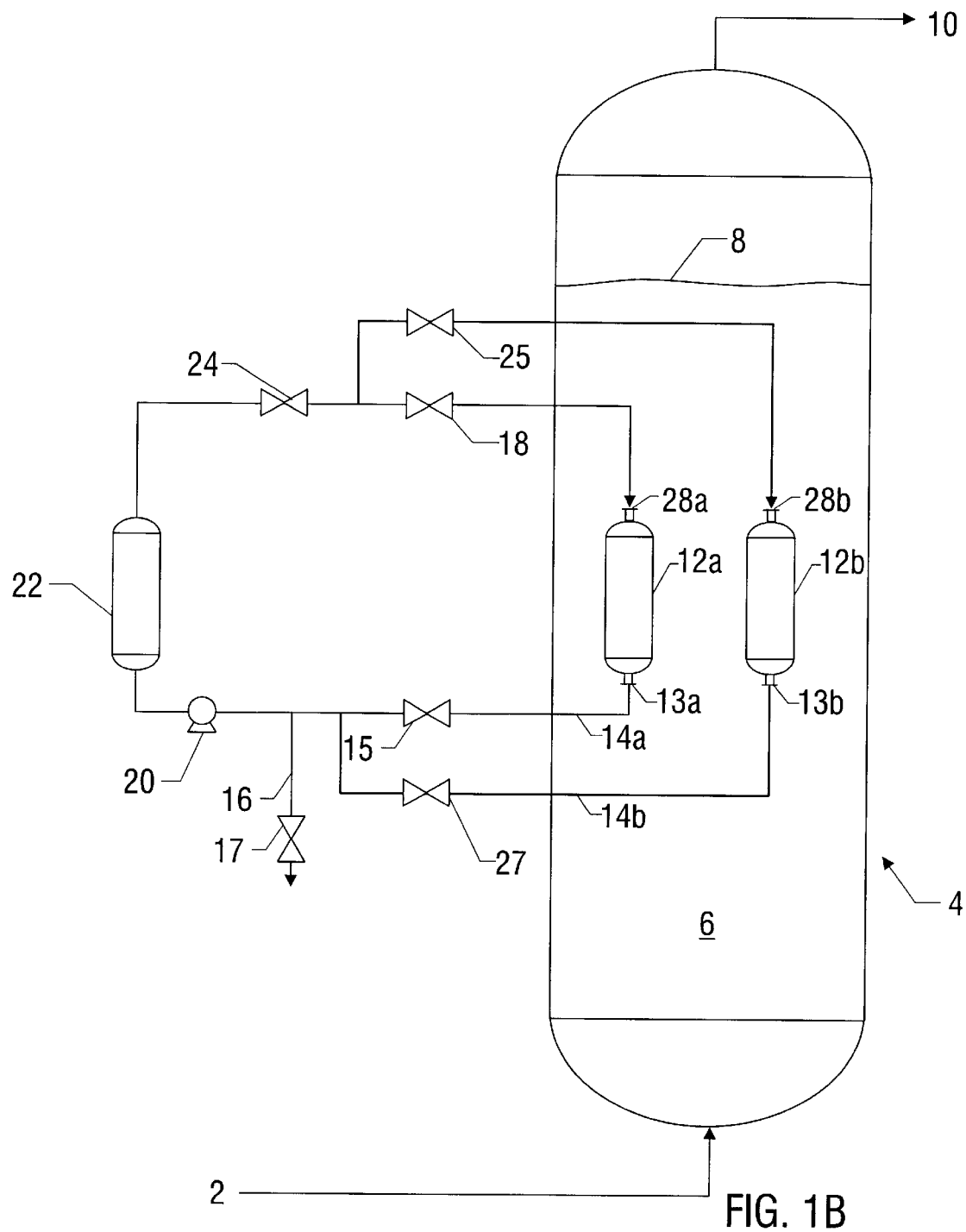
FIG. 1B illustrates an embodiment of the present invention utilizing two filters.

FIG. 1B depicts as an example of the system previously described with two filters 12a and 12b. In this illustrative embodiment, both filters 12a and 12b operate with a single surge vessel 22, and is cleared as described above by use of manipulating block valves 25 and 27. Although FIG. 1B illustrates both filters operating at substantially the same depth within reactor 4, it is envisioned that the present invention applies to a multiplicity of filters 12 operating at different levels within reactor 4.

Figure 4:
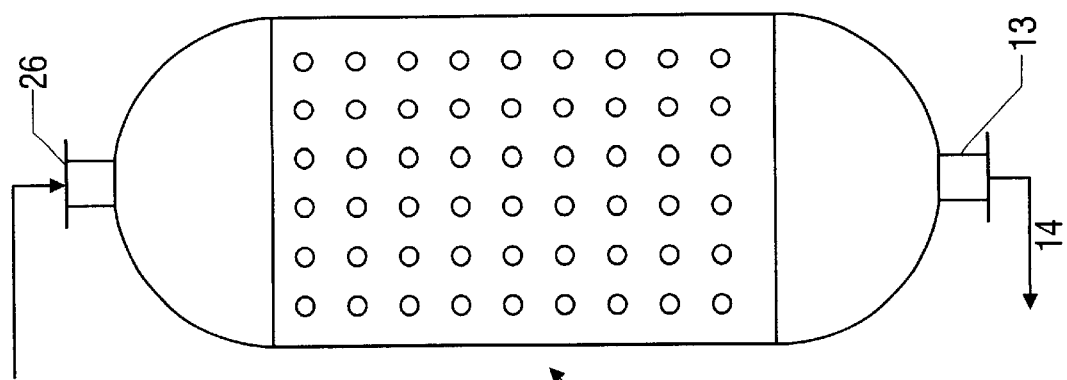
FIG. 4 shows a cylindrical filter for use in the present invention.
Figure 3:
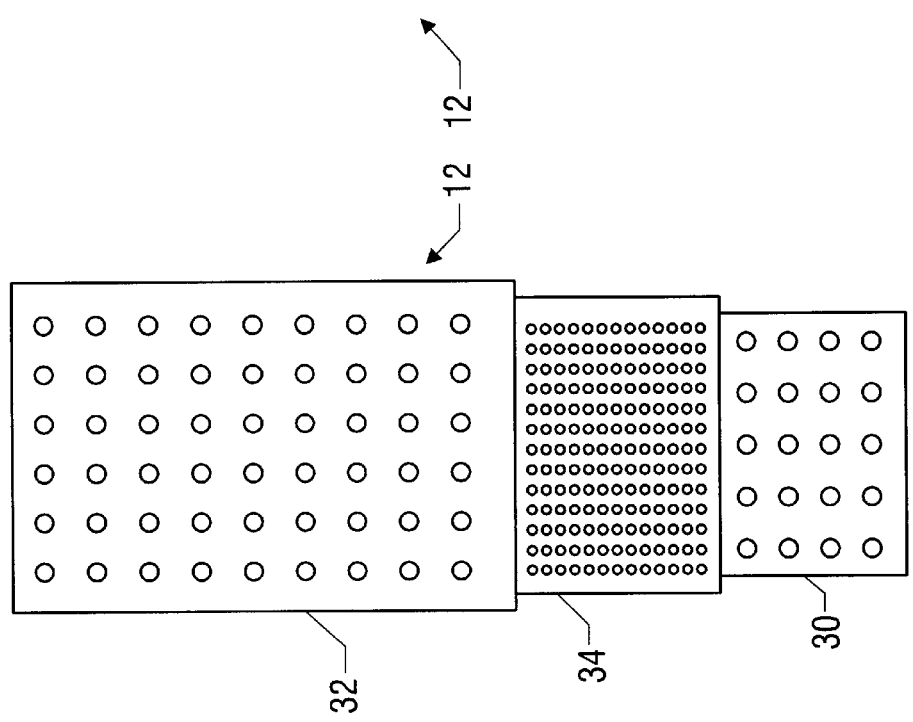
FIG. 3 represents the relationships between the porous product side metal cylinder, the porous reactor side metal cylinder and the filter medium.

The cylindrical filter of the present invention comprises three main elements. First, referring to FIG. 3, cylindrical filter 12 has a porous reactor side metal cylinder 32 having a reactor side metal cylinder outer surface and a reactor side metal cylinder inner surface. Second, a porous product side metal cylinder 30 having a product side metal cylinder outer surface and a product side metal cylinder inner surface. Third, a filter medium 34 located between the porous reactor side metal cylinder inner surface and the porous product side metal cylinder outer surface. The porosity of the reactor side metal cylinder is substantially greater than the porosity of the filter medium, and the porosity of the product side metal cylinder is preferably greater than the porosity of the reactor side metal cylinder. Finally, referring to FIG. 4, the filter 12 also comprises a backflushing liquid inlet 26 and a liquid synthetic hydrocarbon product outlet 13.

The filter medium should allow for about 0.5 to about 100 micron filtration, and can be as little as about 0.5 to about 10 micron filtration. The porosity of the product side metal cylinder is accomplished with about ⅛-inch (about 0.31 cm) to about 1-inch (about 2.54 cm) holes, preferably ¼-inch (about 0.64 cm) to about ½-inch holes (about 1.27 cm), arranged such that the structural integrity of the filter is maintained. It is within the contemplation of the present invention that the porosity of the product side metal cylinder be as large as possible, but with one limitation. That limitation is that if the porosity were too large the product side metal cylinder would not be able maintain its rigid, cylindrical shape and thus lose its structural integrity.

Furthermore, the porosity of the product side metal cylinder should be at least 5 percent greater than the porosity of the reactor side metal cylinder. This means, generally, that the void space of the product side metal cylinder is at least 5 percent greater than that of the reactor side metal cylinder. The reason that the porosity of the product side metal cylinder should be at least 5 percent greater than that of the reactor side metal cylinder is to maximize the pulsing effect of the filter clearing step. As liquid hydrocarbon flows through the filter from the reactor side to the product side during normal operation, the catalyst particles will conglomerate on the outside of the reactor side metal filter. The pulsing action during the cleaning step dislodges the catalyst during the clearing step because of the high pressure flow from within the filter into the reactor; i.e. flow from the product side metal cylinder, through the filter, and finally through the reactor side metal cylinder. To generalize a well know phenomenon in fluid flow, the Bernoulli principle states that if fluid is flowing in a pipe, as the diameter of the pipe decreases the velocity of the fluid increases. The purpose of having the product side metal cylinder more porous than the reactor side metal cylinder is to capture the effect of that phenomenon. The increased velocity through the reactor side metal cylinder gives the liquid hydrocarbon, in essence, a 'nozzle effect' that greatly assists in the clearing the catalyst off that cylinder.

Figure 2:
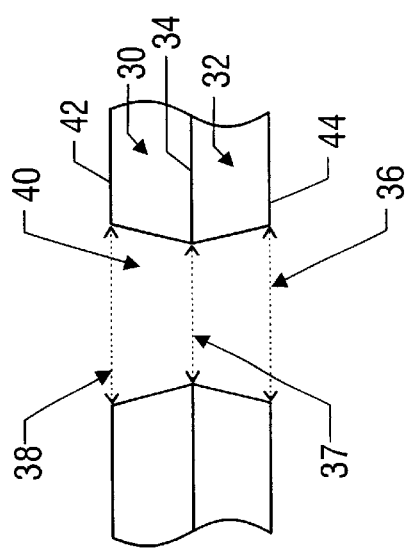
FIG. 2 graphically describes the porosity of the porous product and reactor side metal cylinders.

Another means of assisting in the clearing of the filter involves tapering the openings in the product side metal cylinder such that the diameter of the openings is larger at the product side metal cylinder inner surface than at the product side metal cylinder outer surface. This tapering assists in helping the liquid hydrocarbon push out any catalyst that has possibly plugged off the openings in the reactor side metal cylinder. The velocity of the liquid hydrocarbon at the outer wall of the product side metal cylinder will be greater than that at the inner wall of the product side metal cylinder, assisting in the clearing of the catalyst particles. Referring to FIG. 2, a cross-section of the cylindrical filter can be seen. The opening 40 is shown to be tapering from the larger diameter opening 38 in the product side metal cylinder 30 inner wall 42 to the smaller diameter opening 37 in the product side metal cylinder 30 outer wall. The reactor side metal cylinder 32 outer wall 44 and inner wall openings, 36 and 37 respectively, may be substantially the same size, but the opening at the outer wall 44 can be larger than the opening at the inner surface. The outer wall 44 opening 36 of the reactor side metal cylinder 32 is smaller than the inner wall 42 opening 38 of the product side metal cylinder 30.

There are many advantages to a synthetic hydrocarbon production process such as the one disclosed above. Primarily, using synthetic liquid hydrocarbon, the product of the process, as the backwash material minimizes the effect on the steady state of the reactor. The product side metal cylinder, having larger openings than the reactor side metal cylinder, provides a greater driving force to backwash the filter and remove the conglomerated catalyst from the outside of the filter. Using many filters in combination allows for very short backwash cycles further reducing the effect on the steady state of the reactor system. Finally, and probably most important to the industry, the filters are relatively inexpensive to manufacture and the cylinder design will allow for easy change out of the filter medium during reactor turn-around. Thus, the new process will not only have a positive impact on the system, but will also provide economic savings as well.

It is within the contemplation of the present invention that the above described process be applied to separate liquids from any liquid-solid mixture. A process of this type would involve first passing the liquids through a cylindrical filter located within the liquid-solid mixture. The filter comprises a porous outer metal cylinder having an outer metal cylinder outer surface and an outer metal cylinder inner surface; a porous inner metal cylinder having an inner metal cylinder outer surface and an inner metal cylinder inner surface; and a filter medium located between the porous outer metal cylinder and the porous inner metal cylinder. The liquids that have passed through the filter are then removed through a liquid outlet in the filter so as to provide a continuous flow of liquids from the liquid-solid mixture, through the filter and out the liquid outlet.

The porosity of the outer metal cylinder is preferably greater than the porosity of the filter medium, and the porosity of the inner surface of the product side metal cylinder is greater than the porosity of the outer surface of the reactor side metal cylinder. The filter may also contain a backflushing liquid inlet used to clear any solids that have built up on the outside of the outer metal cylinder during normal operation.

The steps involved in clearing any solids that have built up on the outside of the outer metal cylinder during normal operations involves first pumping a portion of the liquid removed from the filter through the liquid outlet into a surge vessel to make high pressure liquid, such that the pressure of the high pressure liquid in surge vessel is significantly higher than that of the liquid-solid mixture. Second, one should stop the flow of liquids out of the filter through the liquid outlet. Third, one should open a quick opening valve on an outlet of the surge, sending the high pressure liquid into the filter through the backflushing liquid inlet. This allows the high pressure liquid to flow from within the filter out into the liquid-solid mixture so as to dislodge any conglomerated solid particles from the outside of the filter. After the conglomerated solids are removed, the quick opening valve should be closed, and continuous flow of liquids from the liquid-solid mixture, through the filter and out the liquid outlet should be resumed by restarting the flow of liquids out of the filter through the liquid outlet. One or more filter elements may be present in the liquid/solid mixture, in combination with one or more surge vessels.

It is preferred that the porosity if the outer metal cylinder is created by a plurality of tapered openings such that the diameter of the openings is larger at the outer metal cylinder outer surface than at the outer metal cylinder inner surface, although the openings need not be tapered at all. This will help prevent solids from lodging in the openings. It is also preferred that the porosity of the inner metal cylinder is created by a plurality of tapered openings such that the diameter of the openings is larger at the inner metal cylinder inner surface than at the inner metal cylinder outer surface.

Another embodiment of this invention is a method for making the filter as described in the previous embodiments. The steps comprise heat expanding a porous outer metal cylinder, cold shrinking a porous inner metal cylinder, inserting a cylindrical filter medium into the expanded porous outer metal cylinder, and placing the shrunken porous inner metal cylinder into the cylindrical filter medium. After the above steps are done, the combination of the three elements should be brought to an intermediate temperature so as to cool the heat expanded porous outer metal cylinder and heat the cold shrunken porous inner metal cylinder. This will allow for a tight seal between the porous outer metal cylinder and the cylindrical filter medium, as well as a tight seal between the cylindrical filter medium and the porous inner metal cylinder. It is preferred in this method that the porosity of the outer metal cylinder and the porosity of the inner metal cylinder are greater than the porosity of the filter medium.

A final embodiment of the present invention is a filter apparatus than is used or made as illustrated in the previous embodiments. The main components of the filter are a porous outer metal cylinder having an outer metal cylinder outer surface and an outer metal cylinder inner surface; a porous inner metal cylinder having an inner metal cylinder outer surface and an inner metal cylinder inner surface; and a filter medium located between the porous outer metal cylinder and the porous inner metal cylinder. It is preferred that the porosity of the outer metal cylinder and the porosity of the inner metal cylinder is greater than the porosity of the filter medium. The porosity of the outer metal cylinder and the porosity of the inner metal cylinder should be sufficiently large to allow for maximum flow through the filter medium while maintaining the structural integrity of the filter.

Another preferred embodiment of the filter is that the porosity of the outer metal cylinder is created by a plurality of tapered openings. These opening taper such that the diameter of the openings is larger at the outer metal cylinder outer surface than at the outer metal cylinder inner surface, although the openings need not be tapered at all. This will help prevent solids from lodging in the openings. The inner metal cylinder also preferably has similar tapered openings such that the diameter of the openings is larger at the inner metal cylinder inner surface than at the inner metal cylinder outer surface. Preferably, the inner metal cylinder outer surface openings have the same diameter as the outer metal cylinder inner surface openings.

While the structures and methods of the present invention have been described in terms of preferred embodiments, it will be apparent to those of skill in the art that variations may be applied to the what has been described herein without departing from the concept and scope of the invention. All such similar substitutes and modifications apparent to those skilled in the art are deemed to be within the scope and concept of the invention as it is set out in the following claims.

What is claimed is:

1. A method for separating liquid from a liquid-solid mixture comprising:

passing the liquid through a plurality of closed end cylindrical filters located within the liquid-solid mixture, each filter comprising
        a porous outer metal cylinder having an outer metal cylinder outer surface and an outer metal cylinder inner surface;
        a porous inner metal cylinder having an inner metal cylinder outer surface and an inner metal cylinder inner surface;
        a filter medium located between the porous outer metal cylinder and the porous inner metal cylinder; and
        a liquid outlet
    removing the liquid from the filters through the liquid outlets so as to provide a continuous flow of liquid from the liquid-solid mixture, through at least a portion of the filters and out the liquid outlets;
    wherein the liquid outlets are arranged so that liquid flow out of at least one of the filters can be stopped.

2. The method of claim 1 wherein the porosity of the outer metal cylinder is greater than the porosity of the filter medium, and the porosity of the inner metal cylinder is greater than the porosity of the outer metal cylinder.

3. The method of claim 1 wherein the filter further comprises a backflushing liquid inlet.

4. The method of claim 3 further comprising:

pumping a portion of the liquid removed from the filters through the liquid outlets into a surge vessel to make high pressure liquid, such that the pressure of the high pressure liquid in surge vessel is higher than that of the liquid-solid mixture;
    stopping the flow of liquid out of a portion of the filters through the liquid outlets;
    opening a quick opening valve on an outlet of the surge vessel and sending the high pressure liquid through the backflushing liquid inlets of the filters of which the flow of liquid out through the liquid outlets was stopped, allowing the high pressure liquid to flow out of the filters into the liquid solid mixture so as to dislodge any conglomerated solid particles from the outside of the filters;
    closing the quick opening valve; and
    resuming the flow of liquid from the liquid-solid mixture, through the filters of which the flow of liquid out through the liquid outlets was previously stopped, and out the liquid outlets by restarting the flow of liquid out of the filters through the liquid outlets.

5. The method of claim 1 wherein the porosity of the outer metal cylinder is created by a plurality of tapered openings such that the diameter of the openings is larger at the outer metal cylinder outer surface than at the outer metal cylinder inner surface.

6. The method of claim 1 wherein the porosity of the inner metal cylinder is created by a plurality of tapered openings such that the diameter of the openings is larger at the inner metal cylinder inner surface than at the inner metal cylinder outer surface.

* * * * *